J. BIRDSELL.
Cultivator-Teeth.
No. 3,819.  Patented Nov. 9, 1844.
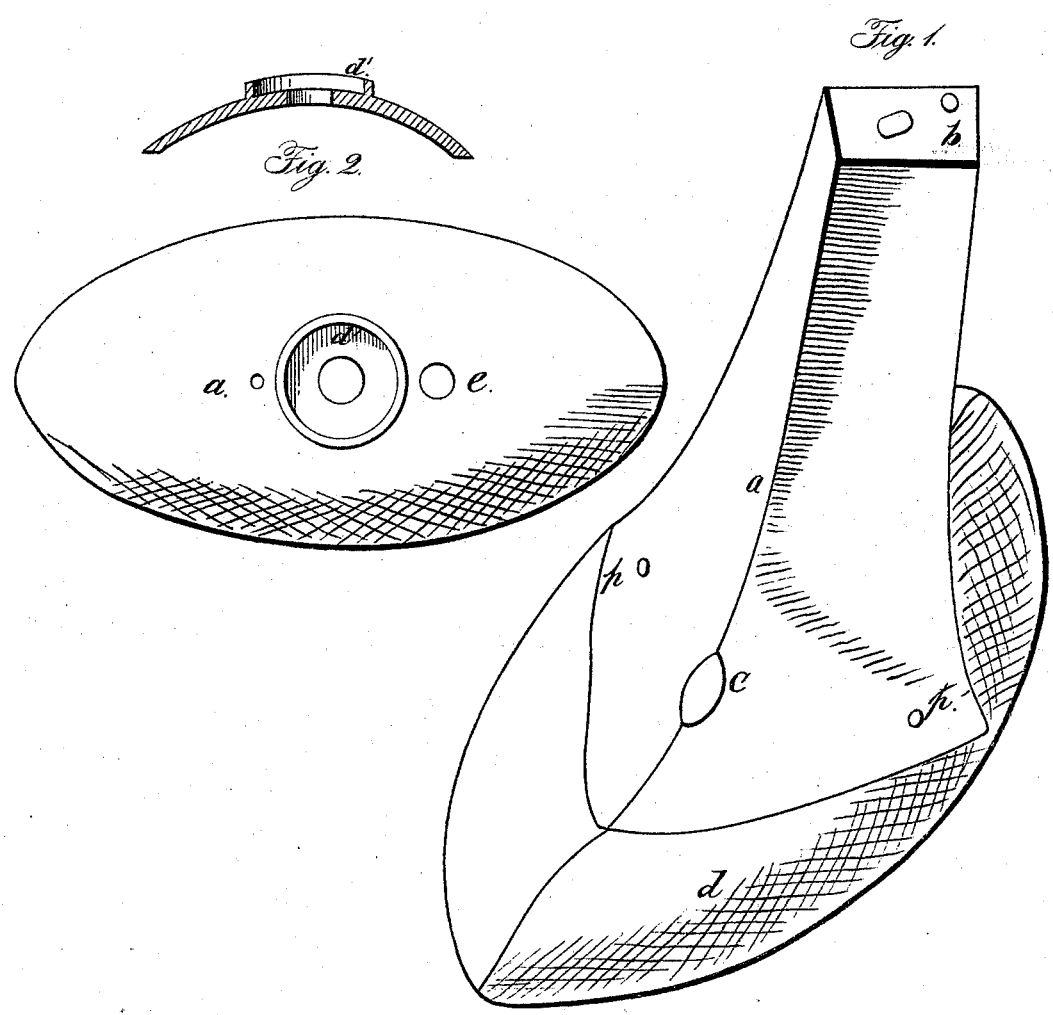

UNITED STATES PATENT OFFICE.

JAMES BIRDSELL, OF HAMORTON, PENNSYLVANIA.

IMPROVEMENT IN CULTIVATOR-TEETH.

Specification forming part of Letters Patent No. 3,819, dated November 9, 1844.

*To all whom it may concern:*

Be it known that I, JAMES BIRDSELL, of Hamorton, in the county of Chester and State of Pennsylvania, have invented a new and useful Self-Sharpening Tooth for Cultivators; and I do hereby declare that the following is a full, clear, and exact description thereof, reference being had to the following drawings, which form a part of this specification, in which—

Figure 1 is a general view of the cutter attached to the tooth; Fig. 2, cutter detached.

The nature of my invention consists in attaching a separate cutter to the tooth of a common cultivator constructed in the ordinary way, said cutter being so formed as to be turned. It is convex on the upper side, and till it is entirely worn out always keeps a sharp edge.

The construction is as follows: The cultivator may be of the best modern construction and the tooth of the most approved form. One of the teeth which I have employed is shown in Fig. 1, *a*. It is made something like a double-mold-board plow, the shank having a hole in it at *b*, through which a bolt passes to hold it to the beam. The tooth is hollow underneath, having the two wings *p* projecting back on each side. At the bottom a bolt, *c*, passes down through the toe of the tooth, the head of which is made to conform to the toe aforesaid, through which it passes. This bolt passes down through a plate, *d*, the center of which has a hole to receive it. This plate fits up against the tooth, and stands, when in place, at an angle of about fifteen degrees, the point being downward.

The shape of the cutter which I prefer is somewhat elliptic in form, being slightly pointed at one end. The center part is thickened, and a shallow socket is made therein at $d'$. (See Fig. 2.) It is made convex on the upper side, like the segment of a cylinder. Either end can be placed forward, and when one end is worn down it can be turned round till it is nearly worn up to the center. To wear it still farther a hole, *e*, can be made each side of the center one, and the cutter carried forward by that means, and thus worn up to the last practicable point.

Having thus fully described my improvement, I wish it to be understood that I do not claim a self-sharpening cultivator-tooth, as that is known; but

What I do claim as my invention, and desire to secure by Letters Patent, is—

The self-sharpening convex cutter, constructed substantially as herein set forth, in combination with the cultivator-tooth, in the manner and for the purpose described.

JAMES BIRDSELL.

Witnesses:
J. J. GREENOUGH,
LAFAYETTE CALDWELL.